Apr. 10, 1923.
H. E. BRUNNER
1,451,531
METHOD OF MANUFACTURING ANTIFRICTION BEARING RINGS
Filed Jan. 6, 1922
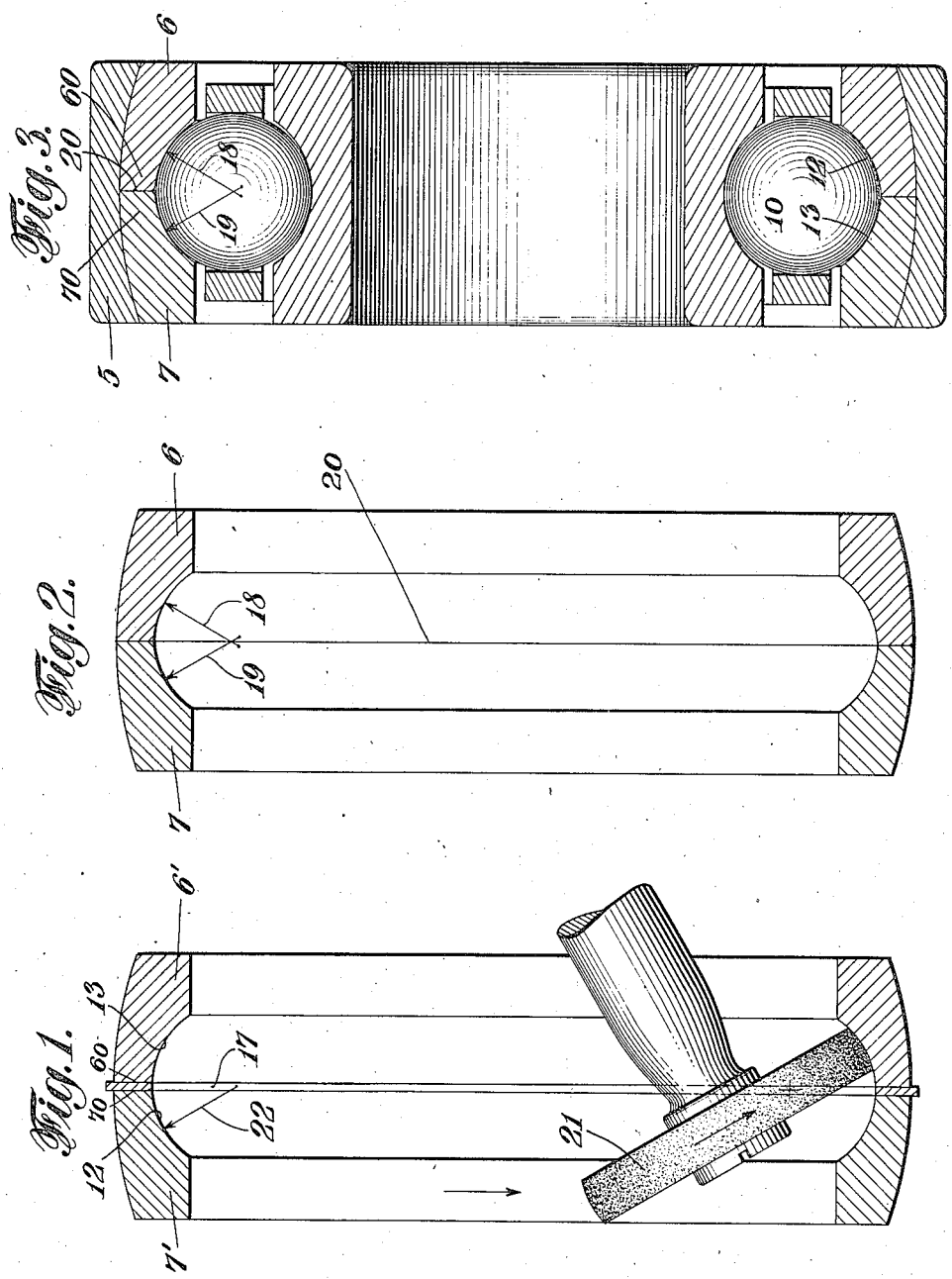
INVENTOR
Harold E. Brunner.
BY Rogers, Kennedy & Campbell
ATTORNEYS.

Patented Apr. 10, 1923.

1,451,531

UNITED STATES PATENT OFFICE.

HAROLD E. BRUNNER, OF LARCHMONT, NEW YORK.

METHOD OF MANUFACTURING ANTIFRICTION BEARING RINGS.

Application filed January 6, 1922. Serial No. 527,445.

*To all whom it may concern:*

Be it known that I, HAROLD E. BRUNNER, a citizen of the United States, residing at Larchmont, in the county of Westchester and State of New York, have invented certain new and useful Improvements in Methods of Manufacturing Antifriction Bearing Rings, of which the following is a specification, reference being had therein to the accompanying drawing.

This invention relates to the production in various bodies of grooves having in cross section the form of an equilateral pointed arch and is peculiarly adapted to the manufacture of rings for anti-friction bearings, providing an improved method or mode of procedure in forming the race grooves in such rings. The subject matter of this application is disclosed in my co-pending application Serial No. 461,332 for anti-friction bearings filed April 14th, 1921. It is frequently desirable in roller bearings, particularly single row ball bearings, to construct the cross section of the race groove in the form of two intersecting arcs of somewhat greater radius than the radius of the ball, whereby this engages the race groove at two points of contact. The contacting points for the balls are located along paths which are generally disposed at substantially equal distances from the median line or plane of the ring at which plane the two curves intersect.

According to my present invention the race ring is split at this median plane, and when the ring parts are slightly separated the curve is continuous from one side to the other. I have discovered that an expeditious manner in which to accurately grind these curves, so that the ball paths shall be properly and symmetrically located in respect of the meeting plane of the two halves, is to form the rings in some suitable automatic machine with approximately the desired curvature, then place the two halves together with a suitable distance piece or shim interposed between them, separating them a distance equal to the distance apart of the centers of the curves of the contemplated race, and while securely held in this separated position grinding the curve by some suitable grinder, preferably one having an oscillatory motion in respect of the ring about an axis which is located midway between the opposing faces of the two ring parts. By this means the curves upon the respective sides are counterparts one of the other, which assures uniformity of pressure upon the respective sides of the balls running upon the track or race thus formed and, therefore, uniform rolling, especially when the bearing is carrying pure radial load.

The splitting of the ring of a ball bearing, whether this be the inner ring or the outer ring, presents several problems one of which has to do with the fact that the split, when this is made in the median plane or one which coincides with the pitch circle of the balls, brings the seam or division between the two halves when they are assembled, at the path where the balls normally roll. One incentive for desiring to split one of the rings at the present time is to enable the assembly of a larger number of balls than is possible to be gotten between rings of the uninterrupted deep-groove type. Another reason, and one which is commencing to receive considerable attention, is the desirability in bearings for certain classes of work to have a two point contact between the ball and at least one of the rings. The method of manufacture which I have discovered makes it extremely simple and economical to so form the groove, on such a bearing as is above referred to, that the ball will, at no time, irrespective of the amount of misalignment or end thrust to which the bearing is subjected, run upon the crack or seam at the meeting of the two parts, and also furnish a groove providing two laterally disposed tracks in perfect parallelism one with the other and with the dividing plane between the halves, and paths which are perfectly concentric one with the other and with the associated parts.

This improved method may be used in forming the race grooves either upon the outer side of an inner ring or the inner side of an outer ring. For the purposes of illustrating this invention I have shown in the drawings the application of this method of procedure to the latter.

In which drawings:

Figure 1, shows in elevation a portion of a spindle and a grinding wheel acting upon a rotating and oscillating split ring, shown in axial section.

Fig. 2 shows the completed ring in axial section, and

Fig. 3 represents a bearing shown in axial section, in which the product of this improvement is incorporated.

Before outlining in detail the method of procedure, it may not be amiss to briefly describe the product it is purposed to produce, and in this connection reference will be made for the moment to Figure 3 of the drawings in which it will be seen that the race groove in the members 6 and 7 is in cross section outlined by intersecting curves 12 and 13 of considerably larger radius than the radius of the ball 10. The radii of such curves are indicated by the lines bearing the reference characters 18 and 19. In one aspect this outline is the perimeter of an area produced by two overlapping discs of like diameter. The blanks, 6'—7', from which the members 6 and 7 are to be formed, are illustrated in Figure 1 securely clamped together with a shim or distance piece, 17, between them, such distance piece being of a thickness equal to the predetermined distance apart of the centers of the curves 12 and 13 of the race grooves in the members 6 and 7, when these are completed. It is now practicable to form a groove, considered in a cross sectional direction, upon the continuous arc of a circle. The face of the groove is acted upon by some grinding or other forming tool. In the present illustration there is shown a grinder having a wheel, 21. Upon the relative oscillation of the work and wheel, the latter traverses upon the work the arc of the circle represented by the radius line 22, the center of which is located midway between the side faces of the inner edges 60 and 70 of the blanks. If it is desired to resort to form grinding, the dressing of the wheel to a single curve of a single radius is much simpler than the dressing of the respective sides of the wheel to curves having centers spaced apart by so small a distance as is desirable in producing the form of race groove above described. After the faces 12 and 13 have been formed and polished, the separating or distance piece, 17, is removed, and the abutting edges of the members placed together meeting at the plane, 20. Fig. 2 shows the rings so placed together, and in Fig. 3 the rings are shown assembled into a bearing, the blanks being secured together face to face with their meeting axes in coincidence, the outer band 5 holding them securely in this assembled relation.

It is to be understood, of course, that the procedure above outlined for carrying out my invention is capable of certain changes and variations, that which is described having been found to give satisfactory results. I, therefore, do not limit myself to precise details, but regard as coming within the spirit of my invention those changes which may come within the scope of the claims.

I claim as my invention:

1. The method of producing grooves in bodies, which consists in providing a pair of members adapted to meet at a plane bisecting the contemplated groove, then spacing the said members apart, and then forming an annular groove therein having in cross section the form of a continuous arc.

2. The method of producing grooves in bodies, which consists in providing a pair of members adapted to meet at a plane disposed at the bottom of the contemplated groove, spacing the members of the pair apart equidistances from said plane, and then applying a rotary grinder to the said members and effecting relative oscillation between the grinder and members about a point located on the said plane thereby forming an annular groove therein having in cross section the form of a continuous arc with its center on the said plane.

3. The method of producing the raceway groove in an anti-friction bearing ring comprising a pair of ring members adapted to meet at the median plane of the bearing, which consists in spacing the ring members apart equidistances from said plane, and then forming an annular groove therein having in cross section the form of a continuous arc with its center on such median plane.

4. The method of producing the raceway groove in an anti-friction bearing ring comprising a pair of ring members adapted to meet at the median plane of the bearing, which consists in spacing the ring members apart equidistances from said plane, then forming an annular groove therein having in cross section the form of a continuous arc with its center on such median plane, and then bringing the two members together, the race groove therein having in cross section the form of a pointed arch.

5. In a method as called for in claim 4 wherein the pair of ring members during the groove forming operation are held apart by an interposed spacing member of a width corresponding to the predetermined distance between the centers of the intersecting arcs constituting the sides of an equilateral arch.

6. The method of forming a composite ring with a race groove having in cross section the form of an equilateral pointed arch, which method consists in providing two annular blanks to constitute the composite ring, which blanks are adapted to meet at a plane bisecting the contemplated groove, sustaining said blanks in spaced relations with their axes in alignment, forming in the spaced blanks an annular groove having in cross section the form of a continuous arc, and finally bringing and securing said blanks together face to face with their axes in coincidence.

In testimony whereof, I have affixed my signature hereto.

HAROLD E. BRUNNER.